US006054007A

United States Patent [19]

[11] Patent Number: 6,054,007

Boyd et al.

[45] Date of Patent: Apr. 25, 2000

[54] METHOD OF FORMING SHAPED ADHESIVES

[75] Inventors: Gary T. Boyd, Woodbury; Robert J. DeVoe, Oakdale; Ilya Gorodisher; David A. Ylitalo, both of Stillwater, all of Minn.

[73] Assignee: 3M Innovative Properties Company, Saint Paul, Minn.

[21] Appl. No.: 08/835,681

[22] Filed: Apr. 10, 1997

[51] Int. Cl.[7] .......... C08F 2/50

[52] U.S. Cl. .......... 156/245; 156/273.3; 156/275.5; 156/307.1

[58] Field of Search .......... 156/245, 272.3, 156/273.2, 275.5, 307.1

[56] References Cited

U.S. PATENT DOCUMENTS

| | | | |
|---|---|---|---|
| 4,154,634 | 5/1979 | Shobert et al. | 156/180 |
| 4,393,195 | 7/1983 | Gaku et al. . | |
| 4,576,850 | 3/1986 | Martens . | |
| 4,666,954 | 5/1987 | Forgo et al. | 156/273.3 |
| 4,831,070 | 5/1989 | McInally et al. . | |
| 4,950,696 | 8/1990 | Palazotto et al. . | |
| 4,952,342 | 8/1990 | Drain et al. | 156/273.3 |
| 4,985,340 | 1/1991 | Palazzotto et al. . | |
| 5,086,086 | 2/1992 | Brown-Wensley et al. . | |
| 5,252,694 | 10/1993 | Willett et al. . | |
| 5,317,067 | 5/1994 | Yagi et al. . | |
| 5,376,428 | 12/1994 | Palazzotto et al. . | |
| 5,453,450 | 9/1995 | Kinzer et al. . | |
| 5,464,693 | 11/1995 | Ono et al. . | |
| 5,609,806 | 3/1997 | Walsh et al. | 156/275.5 |

FOREIGN PATENT DOCUMENTS

| | | |
|---|---|---|
| 0 528 440 | 2/1993 | European Pat. Off. . |
| 55-09549 | 7/1980 | Japan . |
| 56-049780 | 5/1981 | Japan . |
| 4-028724 | 1/1992 | Japan . |
| 6-055572 | 3/1994 | Japan . |
| WO 96 14349 | 5/1996 | WIPO . |

OTHER PUBLICATIONS

"Submicrometer resolution replication of relief patterns for integrated optics" G.D. Aumilla et al. *Journal of Applied Physics* vol. 45, No. 10, (Oct. 1974) p. 4557.

*Encyclopedia of Polymer Science and Engineering*, vol. 8, John Wiley & Sons, New York (1984), pp. 279–332.

*Primary Examiner*—Jan H. Silbaugh
*Assistant Examiner*—Kenneth M. Jones
*Attorney, Agent, or Firm*—Lorraine R. Sherman; Melanie Gover

[57] ABSTRACT

A shaped adhesive article is prepared by a method comprising the steps of shaping an adhesive mixture in a mold, said mold having one or more featured surfaces, said mixture including a first polymer precursor and a second polymer precursor, or a first polymer precursor and a thermoplastic polymer, polymerizing said first polymer precursor in said mold, to produce a shaped adhesive article having one or more featured surfaces, removing said shaped adhesive article from said mold, and adhering one or more of said featured surfaces to a substrate.

17 Claims, 1 Drawing Sheet

METHOD OF FORMING SHAPED ADHESIVES

FIELD OF THE INVENTION

This invention relates to shaped adhesive articles having at least one surface with features thereon, the surface when adhered to a substrate provides a composite structure. This invention also provides a method for producing the shaped adhesive article and composite structure.

BACKGROUND OF THE INVENTION

Many materials, techniques and processes are known for replicating various microstructure-bearing surfaces in the form of embossed, cast or molded polymeric articles; see, e.g., *J. Applied Physics*, Vol. 45, No. 10, p. 4557 (October, 1974). U.S. Pat. No. 4,576,850 describes a method of making shaped articles having replicated microstructured surfaces wherein a fluid, castable, one-part radiation addition-polymerizable, crosslinkable, oligomeric composition fills a mold master and the filled mold is irradiated so as to cause polymerization of the oligomeric composition and form the desired article. The articles are monolithic, and no adhesive articles are described.

Interpenetrating polymer networks (IPNs) and semi-interpenetrating polymer networks (semi-IPNs) are known. IPNs result when two polymers are formed from monomers independently in the presence of each other so that the resulting two independent crosslinked polymer networks are physically intertwined but are essentially free of chemical bonds between them. Semi-IPNs are defined as polymer networks of two or more polymers wherein one polymer is crosslinked and one is uncrosslinked. IPNs and semi-IPNs have been described in, e.g., *Encyclopedia of Polymer Science and Engineering*, Vol. 8; John Wiley & Sons, New York (1984), p. 279–332.

Many examples of IPNs and semi-IPNs are known that are prepared when a mixture comprising two or more monomers that polymerize independently, e.g., by distinct and separate mechanisms such that copolymerization does not occur, is subjected to polymerization conditions for each monomer simultaneously or sequentially. In a number of these cases, the resulting IPN or semi-IPN can be an adhesive composition. In cases of sequential polymerization, the intermediate composition can be an adhesive that is cured (i.e., final polymerization takes place) at a site remote from the first polymerization. U.S. Pat. No. 4,393,195 describes cured, moldable resins comprising a mixture and/or a preliminary reaction product of a cyanate ester, an acrylic epoxy ester and a polyfunctional maleimide that is said to have good adhesive power. Microstructured adhesives are not described. U.S. Pat. Nos. 4,950,696, 4,985,340, 5,086,086, 5,252,694 and 5,376,428, 5,453,450 describe several dual-curable systems comprising two or more separately-curable monomers such as acrylates, cyanates, urethanes, and epoxies, the polymerization products of which are described as being moldable and having adhesive properties. However, no description of the preparation of microstructured adhesives is offered.

U.S. Pat. No. 5,317,067 and Japan Patent Application (Kokai) JP 4 028724 describe a curable epoxy resin - thermoplastic resin mixture that is molded or die-cut into a desired shape, and later heated to cure the epoxy resin component. Representative thermoplastic resins include polyamides, polycarbonates, polyurethanes, polyesters, silicones, phenoxys, poly(vinyl chloride), methacrylates, etc. Formulations are limited to a maximum of 33 weight percent thermoplastic resin.

It is known in the art to mold fully-cured pressure-sensitive adhesives (PSAs) into useful shapes prior to application to a workpiece (see, e.g., U.S. Pat. No. 4,831,070). When a PSA is used, no post-molding curing is required or takes place.

Japan Patent Application (Kokai) JP 6 055572 describes a method of molding a mixture of polycarbonate resin and curable epoxy resin wherein epoxy cure takes place in the mold and the cured mixture is adhered thereto. Delayed cure, or cure after shaping, is not described.

Japan Patent Application (Kokai) JP 55 090549 describes an adhesive resin composition comprising a melt-processable thermoplastic resin containing a curable epoxy resin. The mixture is cast to a desired shape, then heated to cure the epoxy resin.

Japan Patent Application (Kokai) JP 56 049780 describes a curable mixture comprising a curable epoxy resin and a thermosetting acrylonitrile-butadiene copolymer containing reactive carboxyl groups. Heating the cast or molded mixture effects epoxy cure. Alternatively, the mixture can contain an epoxy curative that is only activated at high temperatures after a molded article is formed.

U.S. Pat. No. 5,464,693 describes an adhesive mixture that is cast or molded to a desired shape, then placed on a workpiece and cured by means of a crosslinking agent that is effective only when heated to a temperature higher than that necessary for molding.

SUMMARY OF THE INVENTION

Briefly, this invention provides a method comprising the steps:

shaping an adhesive mixture in a mold having one or more featured surfaces, said mixture comprising a first polymer precursor and a second polymer precursor, or a first polymer precursor and a thermoplastic polymer, polymerizing said first polymer precursor in said mold to produce a shaped adhesive article having one or more featured surfaces, removing said shaped adhesive article from said mold, and adhering one or more of the surfaces of the shaped adhesive article to a substrate.

Preferably, the first polymer precursor is a thermosettable polymer precursor. In a preferred embodiment, a featured surface of said adhesive article is adhered to a substrate.

The method uses a mold or die to create patterned interpenetrating network polymers (IPNs) or semi-interpenetrating network polymers (semi-IPNs). For IPNs, the process involves casting a liquid formulation onto a mold, or injecting the formulation into a molding chamber, and completing a first stage of cure to create a composition comprising a cured polymer and one or more curable monomers which, when removed from the mold, retains the mold features. The molded part can then be adhered to a desired component or used to bond a multiplicity of separate components optionally by completion of a second stage of cure, optionally by a means differing from that of the first stage of cure. For semi-IPNs, the process involves embossing a film onto a mold, usually at elevated temperatures, resulting in a partially cured polymer composition which substantially retains the mold features. The molded part is then adhered to a desired component or used to bond a multiplicity of separate components by completion of a cure stage.

In another aspect, this invention relates to a composite structure comprising a shaped adhesive article having at least one surface with features thereon, the article being cured in a mold, and the surface being adhered to a substrate. The features may or may not be substantially retained after the adhesion step.

In yet another aspect, this invention relates to a shaped adhesive polymeric article comprising one or more surfaces with features thereon.

In this application:

"polymer precursor" means a monomer or oligomer plus initiator or catalyst which when activated by application of energy, e.g., heated or irradiated, converts from a monomer or oligomer to a polymer;

"a first polymer precursor that is essentially incapable of polymerizing with a second polymer precursor" means that every effort is made to design a polymerized composition that is free of cross-over points between the polymers. However, it is to be appreciated that it is possible, but not intended, that a very small number of cross-over points may occur but these do not interfere with the performance of the invention.

"polymerizable species" means a monomer capable of homo- or co-polymerization or two or more polymer precursors capable of chemical reaction, e.g., condensation, to produce a polymer;

"featured surface" means a surface that depicts or characterizes the predetermined desired utilitarian purpose or function of an article, the features including discontinuities such as projections and indentations that deviate in profile from the average profile of the surface;

"group" or "compound" or "monomer" or "polymer" means a chemical species that allows for substitution or which may be substituted by conventional substituents which do not interfere with the desired product; e.g., substituents can be alkyl, alkoxy, aryl, phenyl, halo (F, Cl, Br, I), cyano, nitro, etc.;

"interpenetrating polymer network" (IPN) means a network of two or more polymers that is formed by polymerization of two or more monomers independently in the presence of each other so that the resulting independent crosslinked polymer networks are physically intertwined but are essentially free of chemical bonds between them;

"semi-interpenetrating polymer network" (semi-IPN) means a polymer network of two or more polymers that is formed by polymerization of two or more monomers independently in the presence of each other so that the polymers are independent but are physically intertwined and are essentially free of chemical bonds between them and wherein at least one polymer is crosslinked and at least one is uncrosslinked;

"substantially retained" means more than 90% of the dimensions (height, width, depth) of the structured surface are retained; and "thermoforming" means forming a polymer or polymer precursor(s) into a shape or structure at a temperature above the softening point temperature of the polymer or polymer precursor(s), typically in a mold or die, followed by cooling the formed material and removing from the mold or die;

"thermoplastic polymer" means a polymer that is capable of being repeatedly softened by heating and hardened by cooling through a characteristic temperature range, wherein the change upon heating is substantially physical;

"thermosetting polymer" or "thermoset" means a polymer that is capable of being changed chemically into a substantially infusible or insoluble product when cured by heat or other means.

The method is useful for creating molded components which can be adhered to a surface, thereby eliminating the need for an additional adhesive layer. It is also useful for creating molded components which act as an adhesive between surfaces. The structuring of such an adhesive can be used to vary the surface tack and provide adhesion which is pressure sensitive. The shaped adhesive article of the invention comprising a featured surface is useful as a structured adhesive. The cured molded material can provide a structural abrasive.

The present invention article and method provide advantages over the art, including repeated repositionability prior to permanent fastening, a wide variety of cure mechanisms possible for fasteners, and separation in time and space of feature formation from permanent cure or adhesion.

DETAILED DESCRIPTION OF PREFERRED EMBODIMENTS

Figure 1:
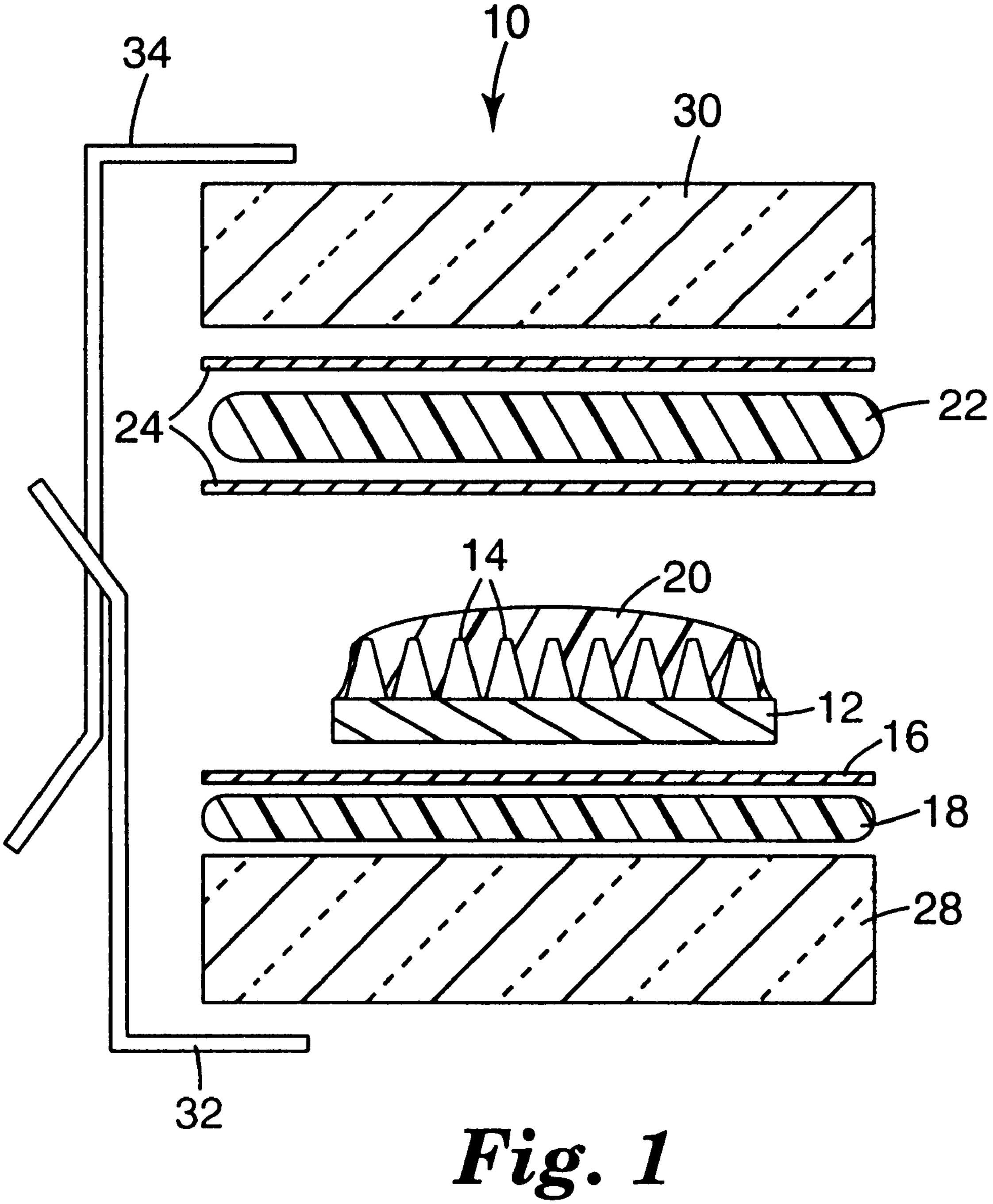
FIG. 1 is an enlarged cross-sectional view of an apparatus comprising materials in the cast and cure process of the present invention.

The present invention provides a composite structure comprising a shaped adhesive article having one or more surfaces with features thereon, the featured surface being adhered to a substrate. The features may or may not be substantially retained after the adhesion step.

In another aspect, the present invention provides a method comprising the steps:

providing and shaping a shaped adhesive article comprising at least one polymer precursor and, optionally, at least one polymer, the shaped adhesive article having one or more featured surfaces; and adhering one or more of the featured surfaces to a substrate. The invention produces an adhesive article with shaped features, which may or may not be retained during bonding, where the material is a mixture of monomers or of a monomer and polymer. The shaping and adhesion processes can be one of several methods described below.

In a first embodiment, the shaped adhesive article can be produced by polymerizing a first polymer precursor, the first polymer precursor being in the presence of a second polymer precursor that is essentially incapable of polymerizing with the first polymer precursor, the first polymerization taking place in a mold or die having a surface with features complementary to the featured surface of the shaped adhesive article; and, after removal from the mold, the adhering to a substrate is provided by polymerization of the second polymer precursor in contact with the surface of the substrate. The method of this embodiment can produce one or both of a semi-interpenetrating polymer and an interpenetrating polymer.

In this embodiment, two types of monomers can be mixed. The molding process can be accomplished by polymerizing one of these monomer types on the mold, resulting in a solid polymer with the second type monomer still unpolymerized. This shaped object can then be bonded to a surface by curing the second type of monomer. For example, an acrylate which can be crosslinked (i.e., a thermoset) or uncrosslinked (i.e., a thermoplastic) and an epoxy resin precursor can be mixed, after which the acrylate can be cured on the mold, released from the mold and then bonded to a substrate by heating and curing the epoxy. Many kinds of acrylates (or epoxies) can be included in the mixture, as they can all polymerize using the same type of initiator (i.e., free radical, cationic, etc.) Inkjet orifice materials were produced according to this embodiment.

Other formulations of this embodiment can include urethane precursors which can be crosslinked (i.e., a thermoset) or uncrosslinked (i.e., a thermoplastic) as the first polymer precursor.

In this embodiment, the polymerization step can produce one or both of an IPN and a semi-IPN.

In a second embodiment, the shaped adhesive article is produced by polymerizing one or more polymer precursors in the presence of a thermoplastic polymer capable of being thermoformed in a mold or die having a surface with features complementary to the featured surface of the shaped article. After removal from the mold, the shaped article can be adhered to the substrate by thermoforming the polymer in contact with the substrate.

In this embodiment, a monomer and polymer are mixed, much as in the first embodiment, except the molding process can be accomplished by curing the monomer on the mold. The resulting shaped adhesive article can then be bonded to a surface by melting the polymers on the substrate.

In some applications, it may be essential to have the molded features (e.g., holes in an inkjet orifice plate) retain their shape during the bonding process. In other applications, this may not be required. As an example application, one may want an adhesive with a structured surface that presents a low contact area, such as bumps on the adhesive surface. If the adhesive at this stage (prior to bonding) is tacky, it could be easily repositioned. Compressing the bumps followed by any of the above bonding steps can create a permanent bond. The features would be distorted in the bonding process.

The features on the surface of the adhesive article may consist of hemispheres or other protruding features which present low surface area to the surface to be bonded under low pressure, and substantially more surface area under high pressure. The second step of the cure can be activated under any desired pressure to provide a range of desired bond strengths.

It is to be appreciated that when the mold is filled with the desired mixture above the level of projections in the mold, the features of the mold will be replicated as indentations or projections. When the mold is filled or closed so that the level does not exceed the height of projections in the mold surface, the feature on the resulting molded adhesive article can take the shape of "holes".

Preferred materials useful in the invention fall into two broad categories and several subcategories. In order to form a composition, in particular, a polymer, into a shape or to give it some surface structure, it must be at least thermoformable, so the first category is those materials that are thermoformable or thermoplastic. The second category is that of thermosets or thermosettable polymers, that is, polymers that are cured or polymerized into substantially infusible or insoluble products under the influence of energy (heat, light, sound) or catalysis, including addition and condensation polymerization as well as crosslinking. As a further criteria, for any given embodiment of the invention, members of the two categories preferably are compatible or miscible or soluble to an extent sufficient to allow formation of an IPN or semi-IPN. It is to be understood that the scope of the present invention produces combinations of two or more thermosets, or can comprise compositions that include at least one thermoset and at least one thermoplastic in order to prepare useful end products.

Thermosets and thermoplastics can be present in weight ratios of from about 1:99 to about 99:1, preferably 30:70 to 70:30, based on the total weight of thermosets plus thermoplastics in the composition. In some cases, narrower ranges may be preferred when solubility or miscibility limits are reached.

Thermoformable or Thermoplastic Polymers

A wide variety of polymers are known to be thermoformable or thermoplastic, and all of them are useful in the invention to the extent that they are compatible with at least one member of the second category (thermosets). Thermoplastic polymers include polyesters, polycarbonates, polyurethanes, polysiloxanes, polyacrylates, polyarylates, polyvinyls, polyethers, polyolefins, polyamides, cellulosics, and combinations and composites thereof. Preferred thermoplastics include polyesters, polyamides, polyurethanes, and polyolefins.

Polyesters useful in the invention include condensation polymers of aliphatic or aromatic polycarboxylic acids with aliphatic or aromatic polyols, so long as the resultant polyesters exhibit thermoplastic behavior at temperatures less than the degradation temperatures of a thermoset or thermoplastic with which it is combined. Useful polyesters are, for example, polycondensates based on polyols and, optionally, monohydric alcohols, on polycarboxylic acids and optionally monobasic carboxylic acids and/or on hydroxycarboxylic acids.

Particularly suitable polycarboxylic acids for producing polyesters are those corresponding to the general formula $$A(\text{—}COOH)_x$$

wherein A represents a covalent bond when x represents (2), or A represents an x-functional, aliphatic group preferably containing from 1 to 20 carbon atoms, a cycloaliphatic group preferably containing from 5 to 16 carbon atoms, an aliphatic-aromatic group preferably containing from 7 to 20 carbon atoms, an aromatic group preferably containing from 6 to 15 carbon atoms or an aromatic or cycloaliphatic group having 2 to 12 carbon atoms containing heteroatoms, such as N, O or S, in the ring, and x represents an integer of from 2 to 4, preferably 2 or 3. Preferred examples of such polycarboxylic acids are oxalic acid, malonic acid, succinic acid, glutaric acid, adipic acid, trimethyl adipic acid, azelaic acid, sebacic acid, decane dicarboxylic acid, dodecane dicarboxylic acid, fumaric acid, maleic acid, hexahydroterephthalic acid, phthalic acid, isophthalic acid, terephthalic acid, benzene-1,3,5-tricarboxylic acid, benzene-1,2,4-tricarboxylic acid, benzene-1,2,3-tricarboxylic acid, naphthalene-1,5-dicarboxylic acid, benzophenone-4,4'-dicarboxylic acid, diphenylsulphone-4,4'-dicarboxylic acid, butane tetracarboxylic acid, tricarballylic acid, ethylene tetracarboxylic acid, pyromellitic acid, benzene-1,2,3,4-tetracarboxylic acid, benzene-1,2,3,5-tetracarboxylic acid.

Preferred hydroxycarboxylic acids are those corresponding to the general formula $$(HOOC\text{—})_y A(\text{—}OH)_z$$

wherein A is as defined above; and y and z independently represent an integer of from 1 to 3, preferably 1 or 2.

Preferred examples are glycolic acid, lactic acid, mandelic acid, malic acid, citric acid, tartaric acid, 2-, 3- and 4-hydroxybenzoic acid and also hydroxybenzene dicarboxylic acids.

Polyols suitable for use in the production of the polyesters are, in particular, those corresponding to the general formula $$B(\text{—}OH)_a$$

wherein B represents an a-functional aliphatic radical containing from 2 to 20 carbon atoms, a cycloaliphatic radical containing from 5 to 16 carbon atoms, an araliphatic radical containing from 7 to 20 carbon atoms, an aromatic radical containing from 6 to 15 carbon atoms and a heterocyclic radical comprising 2 to 12 carbon atoms and containing N, O or S; and a represents an integer of from 2 to 6, preferably 2 or 3.

Preferred examples of such polyols are ethylene glycol, 1,2- and 1,3-propane diol, 1,2-, 1,3-, 1,4- and 2,3-butanediol, 1,5-pentane diol, 2,2-dimethyl-1,3-propane diol, 1,6- and 2,5-hexane diol, 1,12-dodecane diol, 1,12- and 1,18-octadecane diol, 2,2,4- and 2,4,4-trimethyl-1,6-hexane diol, trimethylol propane, trimethylol ethane, glycerol, 1,2,6-hexane triol, pentaerythritol, mannitol, 1,4-bis-hydroxymethyl cyclohexane, cyclohexane-1,4-diol, 2,2-bis-(4-hydroxycyclohexyl)-propane, bis-(4-hydroxyphenyl)-methane, bis-(4-hydroxyphenyl)-sulphone, 1,4-bis-(hydroxymethyl)-benzene, 1,4-dihydroxy-benzene, 2,2-bis-(4-hydroxyphenyl)-propane, 1,4-bis-(ω-hydroxyethoxy)-benzene, 1,3-bis-hydroxyalkyl hydantoins, tris-hydroxyalkyl isocyanurates and tris-hydroxyalkyl-triazolidane-3,5-diones.

Other polyols suitable for use in the production of the polyester polycarboxylic acids are the hydroxyalkyl ethers obtained by the addition of optionally substituted alkylene oxides, such as ethylene oxide, propylene oxide butylene oxide and styrene oxide, onto the above-mentioned polyols.

Preferred examples of such polyols are diethylene glycol, triethylene glycol, dipropylene glycol, tripropylene glycol, dibutylene glycol, 1,4-bis-(2-hydroxyethoxy)cyclohexane, 1,4-bis-(2-hydroxyethoxy-methyl)-cyclohexane, 1,4-bis-(2-hydroxyethoxy)-benzene, 4,4'-bis-(2-hydroxyethoxy)-diphenylmethane, -2-diphenyl-propane, -diphenyl ether, -diphenyl sulphone, -diphenyl ketone and -diphenyl cyclohexane.

The carboxylic acids or carboxylic acid derivatives used and the polyols used may, of course, also be oligomeric.

The residues of alcohols and acids containing cycloaliphatic structures are to be understood to be the alcohols and acids, respectively, reduced by the hydrogen atoms of the alcoholic groups and by the hydroxyl radicals of the carboxyl groups. Particularly preferred alcohol and acid residues having cycloaliphatic structures are dimerized fatty acids and dimerized fatty alcohols.

Preferred polyesters are described, for example, in DE-OS No. 2,942,680 and in U.S. Pat. No. 3,549,570. The number average molecular weight of preferred polyesters can be from about 700 to about 8000.

Polyamides useful as thermoformable components of the present invention include fully pre-polymerized condensation polymers characterized by the presence of the amide group, —CONH—, in the polymer backbone. Polyamides are prepared, e.g., by the condensation polymerization of a polyfunctional carboxyl-containing species such as a dicarboxylic acid or a dicarboxylic acid halide with a polyfunctional amine, or by self-condensation of a bifunctional molecule that has both amine- and carboxyl-functionality. The reactive species can be individually aliphatic, aromatic, carbocyclic, polycyclic, saturated, unsaturated, straight chain or branched. Polyamides can be the polymerization product of a single polycarboxyl-functional species with a single polyamine species as well as the polymerization product of a mixture of polycarboxyl species and a mixture of polyamine species. Industry has developed a number of routes to polyamides, all of which are intended to be included in the present definition. While the general class of polyamides known as "nylon" is the most abundant in commerce, the present definition is not intended to be limited thereto. Preferred polyamides for the present invention include Nylon 6, Nylon 6,6, Nylon 6,10, Nylon 12, and the family of Nylon materials available from DuPont Co., Wilmington, Del. and the Versamide™ family of polyamides available from Henkel Corp., Ambler, Pa.

Thermoplastic homopolymeric polyolefins useful in the invention include polyethylene, polypropylene, poly-1-butene, poly-1-pentene, poly-1-hexene, poly-1-octene and related polyolefins. Preferred homopolymeric polyolefins include polyethylene (e.g., Dow HDPE 25455™, available from Dow Chemical Co., Midland, Mich.) and polypropylene (e.g., Shell DS5D45™, available from Shell Chemicals, Houston, Tex. or Exxon Escorene™ 3445 and 3505G, available from Exxon Chemicals, Houston, Tex.). Also useful are copolymers of these alpha-olefins, including poly (ethylene-co-propylene) (e.g., SRD7-462™, SRD7-463™ and DS7C50™, each of which is available from Shell Chemicals), poly(propylene-co-1-butene) (e.g., SRD6-328™, also available from Shell Chemicals), and related copolymers. Preferred copolymers are poly(ethylene-co-propylene). Also useful is the Vestoplast™ series of polyolefins, available from Huls America Inc., Piscataway, N.J.

The semi-IPNs of the invention also comprise functionalized polyolefins, i.e., polyolefins that have additional chemical functionality, obtained through either copolymerization of olefin monomer with a functional monomer or graft copolymerization subsequent to olefin polymerization. Typically, such functionalized groups include O, N, S, P, or halogen heteroatoms. Such reactive functionalized groups include carboxylic acid, hydroxyl, amide, nitrile, carboxylic acid anhydride, or halogen groups. Many functionalized polyolefins are available commercially. For example, copolymerized materials include ethylene-vinyl acetate copolymers, such as the Elvax™ series, commercially available from DuPont Chemicals, Wilmington, Del., the Elvamide™ series of ethylene-polyamide copolymers, also available from DuPont, and Abcite 1060WH™, a polyethylene-based copolymer comprising approximately 10% by weight of carboxylic acid functional groups, commercially available from Union Carbide Corp., Danbury, Conn. Examples of graft-copolymerized functionalized polyolefins include maleic anhydride-grafted polypropylene, such as the Epolene™ series of waxes commercially available from Eastman Chemical Co., Kingsport, Tenn. and Questron™, commercially available from Himont U.S.A., Inc., Wilmington, Del.

Thermosetting polymers

Thermosetting polymers, or "thermosets," useful in the invention include acrylates, epoxies, cyanate esters, and urethanes, vinyls (i.e., polymers obtained from polymerization of ethylenically-unsaturated monomers other than acrylates). These polymers can be prepared by free-radical or cationic polymerization of their respective monomers or condensation reactants.

Cationically-polymerizable monomers useful in the invention include but are not limited to epoxy-containing materials, alkyl vinyl ethers, cyclic ethers, styrene, divinyl benzene, vinyl toluene, N-vinyl compounds, 1-alkyl olefins (alpha olefins), lactams and cyclic acetals.

Cyclic ethers (e.g., epoxides) that can be polymerized in accordance with this invention include those described in Frisch and Reegan, *Ring-Opening Polymerizations* Vol. 2 (1969). Suitable 1,2-cyclic ethers include monomeric and polymeric types of epoxides. Particularly suitable are the aliphatic, cycloaliphatic, and glycidyl ether type 1,2 epoxides. A wide variety of commercial epoxy resins are available and listed in Lee and Neville, Handbook of Epoxy Resins (1967) and P. Bruins, *Epoxy Resin Technology* (1968). Representative of 1,3- and 1,4-cyclic ethers that can be polymerized in accordance with this invention are oxetane, 3,3-bis(chloromethyl)oxetane, and tetrahydrofuran.

Additional cationically-polymerizable monomers are described in U.S. Pat. No. 5,252,694 at col. 4, line 30 through col. 5, line 34, the description of which is incorporated herein by reference. Preferred monomers of this class include epoxy resins EPON™828, and EPON™1001F (Shell Chemicals, Houston, Tex.) and the ERL series of cycloaliphatic epoxy monomers such as ERL-422 ™ or ERL-4206™ (Union Carbide Corp., Danbury, Conn.).

Optionally, monohydroxy- and polyhydroxy-alcohols may be added to the curable compositions of the invention, as chain-extenders for the epoxy resin. Suitable examples of alcohols include but are not limited to methanol, ethanol, 1-propanol, 2-propanol, 1-butanol, 1-pentanol, 1-hexanol, 1-heptanol, 1-octanol, pentaerythritol, 1,2-propanediol, ethylene glycol, 1,4-butanediol, 1,5-pentanediol, 1,6-hexanediol, 1,4-cyclohexane dimethanol, 1,4-cyclohexanediol and glycerol.

Preferably, compounds containing hydroxyl groups, particularly compounds containing from about 2 to 50 hydroxyl groups and above all, compounds having a weight average molecular weight of from about 50 to 25,000, preferably from about 50 to 2,000, for example, polyesters, polyethers, polythioethers, polyacetals, polycarbonates, poly(meth) acrylates, and polyester amides, containing at least 2, generally from about 2 to 8, but preferably from about 2 to 4 hydroxyl groups, or even hydroxyl-containing prepolymers of these compounds, are representatives compounds useful in accordance with the present invention and are described, for example, in Saunders, *High Polymers*, Vol XVI, "Polyurethanes, *Chemistry and Technology*," Vol. I, pages 32–42, 44–54 and Vol. II, pages 5–6, 198–99 (1962, 1964), and in *Kunststoff-Handhuch*, Vol. VII, pages 45–71 (1966). It is, of course, permissible to use mixtures of the above-mentioned compounds containing at least two hydroxyl groups and having a molecular weight of from about 50 to 50,000 for example, mixtures of polyethers and polyesters.

In some cases, it is particularly advantageous to combine low- melting and high-melting polyhydroxyl containing compounds with one another (German Offenlegungsschrift No. 2,706,297).

Low molecular weight compounds containing at least two reactive hydroxyl groups (molecular weight (Mn) from about 50 to 400) suitable for use in accordance with the present invention are compounds preferably containing hydroxyl groups and generally containing from about 2 to 8, preferably from about 2 to 4 reactive hydroxyl groups. It is also possible to use mixtures of different compounds containing at least two hydroxyl groups and having a molecular weight in the range of from about 50 to 400. Examples of such compounds are ethylene glycol, 1,2- and 1,3-propylene glycol, 1,4- and 2,3-butylene glycol, 1,5-pentanediol, 1,6-hexanediol, 1,8-octanediol, neopentyl glycol, 1,4-cyclohexane dimethanol, 1,4-cyclohexanediol, trimethylolpropane, 1,4-bis- hydroxymethyl cyclohexane, 2-methyl-1,3-propanediol, dibromobutenediol (U.S. Pat. No. 3,723,392), glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxy diphenyl propane and dihydroxy methyl hydroquinone.

Other polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschrift Nos. 2,639,084, 2,714,084, 2,714,104, 2,721,186, 2,738,154 and 2,738,512).

It is contemplated that polyfunctional alcohols such as carbowaxes poly(ethylene glycol), poly(ethylene glycol methyl ether), poly(ethylene glycol) tetrahydrofurfuryl ether, poly(propylene glycol) may also be used in the compositions of the present invention.

Higher molecular weight polyols include the polyethylene and polypropylene oxide polymers in the molecular weight (Mn) range of 200 to 20,000 such as the Carbowax™ polyethyleneoxide materials available from Union Carbide Corp., Danbury, Conn., caprolactone polyols in the molecular weight range of 200 to 5,000 such as the Tone™ polyol materials available from Union Carbide, polytetramethylene ether glycol in the molecular weight range of 200 to 4,000, such as the Terathane™ materials available from DuPont Co., Wilmington, Del., hydroxyl-terminated polybutadiene resins such as the Poly bd™ materials available from Elf Atochem, phenoxy resins, such as those commercially available from Phenoxy Associates, Rock Hill, S.C., or equivalent materials supplied by other manufacturers.

Urethane polymers useful in the present invention comprise one or more compounds that comprise at least one isocyanate group and one or more compounds that comprise at least one —OH functional group that is coreactive with an isocyanate group. Preferably, these reactants are added in approximately stoichiometric amounts. For instance, where one mole of a triisocyanate is used, approximately three moles of a monohydroxy compound can be used to make a urethane.

Useful monoisocyanates include octadecyl isocyanate, butyl isocyanate, hexyl isocyanate, phenyl isocyanate, benzyl isocyanate, naphthyl isocyanate, and the like.

Useful diisocyanates include 1,6-hexamethylene diisocyanate (HMDI), 1,4-tetramethylene diisocyanate, 2,4- and 2,6-toluene diisocyanate (TDI), diphenylmethane-4,4'-diisocyanate (MDI), cyclohexane 1,3- and 1,4-diisocyanate, isophorone diisocyanate (IPDI), 1,5- and 1,4-naphthalene diisocyanate, dicyclohexylmethane-4,4'-diisocyanate, and the like.

Useful tri- and polyisocyanates include Vornate M220™ polymeric polyisocyanate (commercially available from Dow Chemical Co., Midland, Mich.), Desmodur N-100™, Desmodur N-3300™, (both of which are commercially available from Bayer Chemicals, Philadelphia, Pa.), 4,4',4"-triphenylmethane triisocyanate, polymethylene poly (phenylisocyanate) (PMDI), and the like, and combinations thereof.

The hydroxyl-functional component can be present as a mixture or a blend of materials and can contain mono- and poly-hydroxyl containing materials where the hydroxyl hydrogen is sterically and electronically available. Any of the mono- and poly-hydroxy compounds described above can be used in preparing polyurethanes useful in the invention.

Free-radically polymerizable ethylenically-unsaturated monomers useful in the invention include but are not limited to (meth)acrylates and vinyl ester functionalized materials. Of particular use are (meth)acrylates. The starting material can either be monomers or oligomers such be described in U.S. Pat. No. 5,252,694 at col. 5, lines 35–68.

Alternatively, useful monomers comprises at least one free-radically polymerizable functionality. Examples of such monomers include specifically, but not exclusively, the following classes:

Class A—acrylic acid esters of an alkyl alcohol (preferably a non-tertiary alcohol), the alcohol containing from 1 to 14 (preferably from 4 to 14) carbon atoms and include, for example, methyl acrylate, ethyl acrylate, n-butyl acrylate, t-butyl acrylate, hexyl acrylate, isooctyl acrylate, 2-ethylhexyl acrylate, isononyl acrylate, isobornyl acrylate, phenoxyethyl acrylate, decyl acrylate, and dodecyl acrylate;

Class B—methacrylic acid esters of an alkyl alcohol (preferably a non-tertiary alcohol), the alcohol containing from 1 to 14 (preferably from 4 to 14) carbon atoms and include, for example, methyl methacrylate, ethyl methacrylate, n-propyl methacrylate, n-butyl methacrylate, isobutyl methacrylate and t-butyl methacrylate;

Class C—(meth)acrylic acid monoesters of polyhydroxy alkyl alcohols such as 1,2-ethanediol, 1,2-propanediol, 1,3-propane diol, the various butyl diols, the various hexanediols, glycerol, such that the resulting esters are referred to as hydroxyalkyl (meth)acrylates;

Class D—multifunctional (meth)acrylate esters, such as 1,4-butanediol diacrylate, 1,6-hexanediol diacrylate, glycerol diacrylate, glycerol triacrylate, and neopentyl glycol diacrylate;

Class E—macromeric (meth)acrylates, such as (meth) acrylate-terminated styrene oligomers and (meth)acrylate-terminated polyethers, such as are described in PCT Patent Application WO 84/03837 and European Patent Application EP 140941;

Class F—(meth)acrylic acids and their salts with alkali metals, including, for example, lithium, sodium, and potassium, and their salts with alkaline earth metals, including, for example, magnesium, calcium, strontium, and barium.

Although higher cure rates are typically exhibited, it is within the scope of the present invention to also use a seventh class of monomers, namely "Class G" monomers. Class G monomers include nitrogen-bearing monomers selected from the group consisting of (meth)acrylonitrile, (meth)acrylamide, N-substituted (meth)acrylamides, N,N-disubstituted (meth)acrylamides, the latter of which may include substituents of 5- and 6-membered heterocyclic rings comprising one or more heteroatoms, and methyl-substituted maleonitrile, and N-vinyl lactams, such as N-vinyl pyrrolidinone and N-vinyl caprolactam.

Bifunctional monomers may also be used and examples that are useful in this invention possess at least one free radical and one cationically reactive functionality per monomer. Examples of such monomers include, but are not limited to glycidyl (meth)acrylate,hydroxyethyl (meth) acrylate, hydroxypropyl methacrylate and hydroxybutyl acrylate.

Thermosetting cyanate ester resins useful in the invention comprise cyanate ester compounds (monomers and oligomers) each having one or preferably two or more —OCN functional groups, and typically having a cyanate equivalent weight of from about 50 to about 500, preferably from about 50 to about 250. Molecular weight of the monomers and oligomers are typically from about 150 to about 2000. If the molecular weight is too low, the cyanate ester may have a crystalline structure which is difficult to dissolve. If the molecular weight is too high, the compatibility of the cyanate ester with other resins may be poor.

Preferred compositions of the invention include one or more cyanate esters according to formulas I, II, III or IV. Formula I is represented by $$Q(OCN)_p \qquad \text{I}$$

where p is an integer from 1 to 7, preferably from 2 to 7, and wherein Q comprises a mono-, di-, tri-, or tetravalent aromatic hydrocarbon containing from 5 to 30 carbon atoms and zero to 5 aliphatic, cyclic aliphatic, or polycyclic aliphatic, mono- or divalent hydrocarbon linking groups containing 7 to 20 carbon atoms. Optionally, Q may comprise 1 to 10 heteroatoms selected from the group consisting of non-peroxidic oxygen, sulfur, non-phosphino phosphorus, non-amino nitrogen, halogen, and silicon.

Formula II is represented by

II

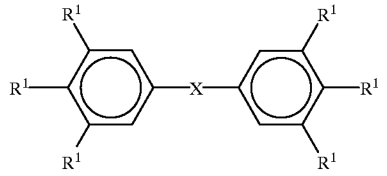

where X is a single bond, a lower alkylene group having from 1 to 4 carbons, —S—, or an $SO_2$ group; and where each $R^1$ is independently hydrogen, an alkyl group having from one to three carbon atoms, or a cyanate group (—OC≡N), with the proviso that at least one $R^1$ group is a cyanate group. In preferred compounds, each of the $R^1$ groups is either —H, methyl or a cyanate group, with at least two $R^1$ groups being cyanate groups.

Formula III is represented by

III

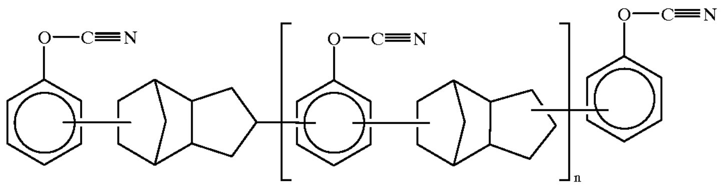

where n is a number from 0 to about 5.

Formula IV is represented by

IV

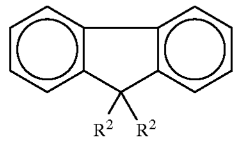

wherein each $R^2$ independently is

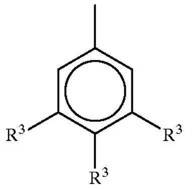

wherein each $R^3$ is independently —H, a lower alkyl group having from about 1 to about 5 carbon atoms, or a cyanate ester group, and preferably is a hydrogen, methyl or a cyanate ester group, with the proviso that the $R^3$s together comprise at least one cyanate ester group.

Useful cyanate ester compounds include, but are not limited to the following:

1,3- and 1,4-dicyanatobenzene;
2-tert-butyl- 1,4-dicyanatobenzene;
2,4-dimethyl- 1,3-dicyanatobenzene;
2,5-di-tert-butyl- 1,4-dicyanatobenzene;
tetramethyl- 1,4-dicyanatobenzene;
4-chloro- 1,3-dicyanatobenzene;
1,3,5-tricyanatobenzene;
2,2'- and 4,4'-dicyanatobiphenyl;
3,3', 5,5'-tetramethyl-4,4'-dicyanatobiphenyl;
1,3-, 1,4-, 1,5-, 1,6-, 1,8-, 2,6-, and 2,7-dicyanatonaphthalene;
1,3,6-tricyanatonaphthalene;
bis(4-cyanatophenyl)methane;
bis(3-chloro-4-cyanatophenyl)methane;
bis(3,5-dimethyl-4-cyanatophenyl)methane;
1,1-bis(4-cyanatophenyl)ethane;
2,2-bis(4-cyanatophenyl)propane;
2,2-bis(3,3-dibromo-4-cyanatophenyl)propane;
2,2-bis(4-cyanatophenyl)- 1,1,1,3,3,3-hexafluoropropane;
bis(4-cyanatophenyl)ester;
bis(4-cyanatophenoxy)benzene;
bis(4-cyanatophenyl)ketone;
bis(4-cyanatophenyl)thioether;
bis(4-cyanatophenyl)sulfone;
tris(4-cyanatophenyl)phosphate, and
tris(4-cyanatophenyl)phosphate.

Also useful are cyanic acid esters derived from phenolic resins, e.g., as disclosed in U.S. Pat. No. 3,962,184, cyanated novolac resins derived from novolac, e.g., as disclosed in U.S. Pat. No. 4,022,755, cyanated bis-phenol-type polycarbonate oligomers derived from bisphenol-type polycarbonate oligomers, as disclosed in U.S. Pat. No. 4,026,913, cyano-terminated polyarylene ethers as disclosed in U.S. Pat. No. 3,595,900, and dicyanate esters free of ortho hydrogen atoms as disclosed in U.S. Pat. No. 4,740,584, mixtures of di- and tricyanates as disclosed in U.S. Pat. No. 4,709,008, polyaromatic cyanates containing polycyclic aliphatic groups as disclosed in U.S. Pat. No. 4,528,366, e.g., QUARTEX™ 7187, available from Dow Chemical, fluorocarbon cyanates as disclosed in U.S. Pat. No. 3,733,349, and cyanates disclosed in U.S. Pat. Nos. 4,195,132, and 4,116,946, all of the foregoing patents being incorporated herein by reference for teachings related to cyanates.

Polycyanate compounds obtained by reacting a phenol-formaldehyde precondensate with a halogenated cyanide are also useful.

Examples of preferred cyanate ester resin compositions include low molecular weight ($M_n$) oligomers, e.g., from about 250 to about 5000, e.g., bisphenol-A dicyanates such as AroCy™ "B-30 Cyanate Ester Semisolid Resin"; low molecular weight oligomers of tetra o-methyl bis-phenol F dicyanates, such as "AroCy™ M-30 Cyanate Ester Semisolid Resin"; low molecular weight oligomers of thiodiphenol dicyanates, such as AroCy™ "T-30", all of which are commercially available from Ciba-Geigy Corp., Hawthorne, N.Y.

Polyhydroxyl compounds (e.g., "polyols"), as described above, can be useful in the preparation of cyanate esters useful in the invention.

Suitable organometallic complex salts useful as cationic initiators include those described in U.S. Pat. No. 5,059,701 and such description is incorporated herein by reference. In addition to those described in U.S. Pat. Nos. 5,059,701 and 5,089,536, the organometallic complex salts described in EPO No. 109,851 are also useful in the present invention. Useful organometallic complex salts used in the present invention have the following formula:

$$[(L^1)(L^2)M^P]^{+q}Y_b$$

wherein

- $M^P$ represents a metal selected from the group consisting of: Cr, Mo, W, Mn, Re, Fe, and Co;
- $L^1$ represents 1 or 2 ligands contributing pi-electrons that can be the same or different ligand selected from the group of substituted and unsubstituted eta$^3$-allyl, eta$^5$-cyclopentadienyl, and eta$^7$-cycloheptatrienyl, and eta$^6$-aromatic compounds selected from eta$^6$-benzene and substituted eta$^6$-benzene compounds and compounds having 2 to 4 fused rings, each capable of contributing 3 to 8 pi-electrons to the valence shell of $M^P$;
- $L^2$ represents none, or 1 to 3 ligands contributing an even number of sigma-electrons that can be the same or different ligand selected from the group of: carbon monoxide, nitrosonium, triphenyl phosphine, triphenyl stibine and derivatives of phosphorus, arsenic and antimony, with the proviso that the total electronic charge contributed to $M^P$ results in a net residual positive charge of q to the complex;
- q is an integer having a value of 1 or 2, the residual charge of the complex cation;
- Y is a halogen-containing complex anion selected from $BF_4^-$, $AsF_6^-$, $PF_6^-$, $SbF_5OH^-$, $SbF_6^-$, and $CF_3SO_3^-$; and
- b is an integer having a value of 1 or 2, the number of complex anions required to neutralize the charge q on the complex cation.

Preferred organometallic initiators are the cyclopentadienyl iron arenes (CpFeArenes), and preferably, $SbF_6^-$ is the counterion. CpFe(arenes) are preferred because they are very thermally stable yet are excellent photoinitiation catalysts.

Useful photochemical cationic initiators comprising onium salts have been described as having the structure ET wherein:

- E is an organic cation selected from diazonium, iodonium, and sulfonium cations, more preferably E is selected from diphenyliodonium, triphenylsulfonium and phenylthiophenyl diphenylsulfonium; and T is an anion, the counterion of the onium salts including those in which T is organic sulfonate, or halogenated metal or metalloid.

Particularly useful cationic initiators can comprise onium salts including, but are not limited to, aryl diazonium salts, diaryl iodonium salts, and triaryl sulfonium salts. Additional examples of the onium salts are described in U.S. Pat. No. 5,086,086, col. 4, lines 29–61, and such description is incorporated herein by reference.

Photoinitiators that are useful in the present invention include aromatic iodonium complex salts and aromatic sulfonium complex salts. The aromatic iodonium complex salts having the formula:

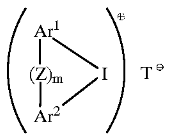

wherein $Ar^1$ and $Ar^2$ are aromatic groups having 4 to 20 carbon atoms and are selected from the group consisting of phenyl, thienyl, furanyl and pyrasolyl groups;

Z is selected from the group consisting of oxygen, sulfur,

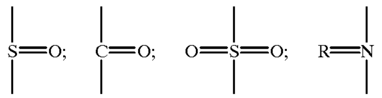

where R is aryl (having 6 to 20 carbon atoms, such as phenyl) or acyl (having 2 to 20 carbon atoms, such acetyl, benzoyl, etc.), a carbon-to-carbon bond, or

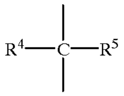

where $R^4$ and $R^5$ are independently selected from hydrogen, alkyl radicals of 1 to 4 carbon atoms, and alkenyl radicals of 2 to 4 carbon atoms;

m is zero or 1; and

T preferably is a halogen-containing complex anion selected from tetrafluoroborate, hexafluorophosphate, hexafluoroarsenate, and hexafluoroantinomate.

Aromatic sulfonium complex salt photoinitiators are described by the formula:

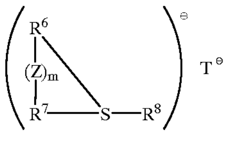

$R^6$, $R^1$ and $R^8$ can be the same or different, provided that at least one of such groups is aromatic and such groups can be selected from the aromatic groups having 4 to 20 carbon atoms (for example, substituted and unsubstituted phenyl, thienyl, furanyl) and alkyl radicals having 1 to 20 carbon atoms. The term "alkyl" as used here is meant to include substituted and unsubstituted alkyl radicals. Preferably, $R^6$, $R^7$ and $R^8$ are each aromatic groups; and Z, m and T are as defined above.

Of the aromatic sulfonium complex salts that are suitable for use in the present invention, the preferred salts are triaryl-substituted salts such as triphenylsulfonium hexafluorophosphate and triphenylsulfonium hexafluoroantinomate. The triaryl substituted salts are preferred because they are more thermally stable than the mono- and diaryl substituted salts.

Thermal initiators useful in the present invention include, but are not limited to azo, peroxide, persulfate, and redox initiators.

Suitable azo initiators known in the art are those that do not contain nitrile groups, such as 2,2'-azobis(methyl isobutyrate)(V-601™), available from Wako Chemicals, Richmond, Va.

Suitable peroxide initiators include, but are not limited to, benzoyl peroxide, acetyl peroxide, lauroyl peroxide, decanoyl peroxide, dicetyl peroxydicarbonate, di(4-t-butylcyclohexyl) peroxydicarbonate (PERKADOX™ 16S, available from Akzo Nobel Chemicals, Chicago, Ill.), di(2-ethylhexyl) peroxydicarbonate, t-butylperoxypivalate (Lupersol™ 11, available from Atochem, Philadelphia, Pa.), t-butylperoxy-2-ethylhexanoate (Trigonox™ 21-C50, available from Akzo Nobel Chemicals, Inc.), and dicumyl peroxide.

Suitable persulfate initiators include, but are not limited to, potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfite; systems based on organic peroxides and tertiary amines, for example, benzoyl peroxide plus dimethylaniline; and systems based on organic hydroperoxides and transition metals, for example, cumene hydroperoxide plus cobalt naphthenate.

Other initiators include, but are not limited to pinacols, such as tetraphenyl 1,1,2,2-ethanediol.

Preferred thermal free-radical initiators are selected from the group consisting of azo compounds that do not contain nitriles and peroxides. Most preferred are V-601, Lupersol™ 11 and Perkadox™ 16S, and mixtures thereof, because of their preferred decomposition temperature—in the range of about 60 to 70° C. Additionally, they are inert toward cationic polymerization initiators.

The initiator is present in a catalytically-effective amount and such amounts are typically in the range of about 0.01 parts to 5 parts, and more preferably in the range from about 0.025 to 2 parts by weight, based upon 100 total parts by weight of monomer or monomer mixture. If a mixture of initiators is used, the total amount of the mixture of initiators would be as if a single initiator was used.

Photoinitiators that are useful for partially polymerizing alkyl acrylate monomer without crosslinking, to prepare syrups, include the benzoin ethers, such as benzoin methyl ether or benzoin isopropyl ether; substituted benzoin ethers, such as anisoin methyl ether; substituted acetophenones, such as 2,2-diethoxyacetophenone and 2,2-dimethoxy-2-phenylacetophenone; substituted alpha-ketols, such as 2-methyl-2-hydroxypropiophenone; aromatic sulfonyl chlorides, such as 2-naphthalene-sulfonyl chloride; bis-acyl phosphine oxides, such as bis-(2,6-dimethoxybenzoyl)-2,4, 4-trimethylpentylphosphine oxide and 2,4,6-trimethylbenzoyl diphenyl phosphine oxide; and photoactive oximes, such as 1-phenyl-1,1-propanedione-2(o-ethoxycarbonyl)oxime. They may be used in amounts, which as dissolved provide about 0.001 to 0.5 percent by weight of the alkyl acrylate monomer, preferably at least 0.01 percent.

It is also within the scope of this invention to add optional adjuvants such as thixotropic agents; plasticizers; toughening agents such as those taught in U.S. Pat. No. 4,846,905; pigments; fillers; abrasive granules, stabilizers, light stabilizers, antioxidants, flow agents, bodying agents, flatting agents, colorants, binders, blowing agents, fungicides, bactericides, surfactants; glass and ceramic beads; and reinforcing materials, such as woven and nonwoven webs of organic and inorganic fibers, such as polyester, polyimide, glass fibers and ceramic fibers; and other additives as known to those skilled in the art can be added to the compositions of this invention. These can be added in an amount effective for their intended purpose; typically, amounts up to about 25 parts of adjuvant per total weight of formulation can be used. The additives can modify the properties of the basic composition to obtain a desired effect. Furthermore, the additives can be reactive components such as materials containing reactive hydroxyl functionality. Alternatively, the additives can be also substantially unreactive, such as fillers, including both inorganic and organic fillers.

Optionally, it is within the scope of this invention to include photosensitizers or photoaccelerators in the radiation-sensitive compositions. Use of photosensitizers or photoaccelerators alters the wavelength sensitivity of radiation-sensitive compositions employing the latent catalysts of this invention. This is particularly advantageous when the latent catalyst does not strongly absorb the incident radiation. Use of a photosensitizer or photoaccelerator increases the radiation sensitivity allowing shorter exposure times and/or use of less powerful sources of radiation. Any photosensitizer or photoaccelerator may be useful if its triplet energy is at least 45 kilocalories per mole. Examples of such photosensitizers are given in Table 2-1 of the reference, S. L. Murov, *Handbook of Photochemistry*, Marcel Dekker Inc., N.Y., 27–35 (1973), and include pyrene, fluoranthrene, xanthone, thioxanthone, benzophenone, acetophenone, benzil, benzoin and ethers of benzoin, chrysene, p-terphenyl, acenaphthene, naphthalene, phenanthrene, biphenyl, substituted derivatives of the preceding compounds, and the like. When present, the amount of photosensitizer of photoaccelerator used in the practice of the present invention is generally in the range of 0.01 to 10 parts, and preferably 0.1 to 1.0 parts, by weight of photosensitizer or photoaccelerator per part of organometallic salt or onium salt.

Examples of molded components which are useful as adhesives are orifice plates, and orifice plates with inkfeed channels for inkjet printers. Current approaches to making orifice plates are to electroform nickel sheets with holes and laminate these plates onto a photo-patterned adhesive, see, for example, U.S. Pat. No. 4,773,971. Molding an adhesive is a more rapid process to produce holes and provides improved adhesion to the photo-patterned layer. Molding the inkfeed channels and orifice plate into a single component which is also an adhesive greatly simplifies the fabrication process and eliminates the need for an additional adhesion layer.

The shaped adhesive articles of the invention are useful as structural adhesives where there can be an adhesive layer between surfaces. The cured material can provide a structural abrasive. The shaped article of the invention when adhered to a substrate can comprise an inkjet orifice plate, a barrier layer, or a combination orifice plate plus barrier layer; it can also comprise a mechanical fastener.

A structured abrasive can comprise a mixture of an IPN formulation and abrasive particles, molded to form surface protrusions during the first stage of cure, followed by adhesion to a desired backing during the second stage of cure. Such an abrasive may also consist of a semi-IPN formulation and abrasive particles, embossed onto a mold, released, and adhered to a desired backing during the cure stage. Alternatively, a structured abrasive can comprise a semi-IPN formulation of the invention molded to form a desired surface structure during the first stage of cure, wherein the molded article remains somewhat tacky after cure. The non-structured surface of the molded article is placed on a backing and the molded surface is coated with abrasive particles, followed by the second stage of cure, at which time the molded article is firmly adhered to the backing and the abrasive particles are fixed in the semi-IPN matrix. These embodiments eliminate the need for an adhesive layer between a structured abrasive and backing.

The objects and advantages of the invention are further illustrated by the following examples, but the particular materials and amounts thereof recited in these examples, as well as other conditions and details, should not be construed to unduly limit this invention. Unless otherwise stated, all parts are parts by weight and all temperatures are degrees centigrade.

EXAMPLES

Comparative Example 1

Epoxy-Polyester Shaped Adhesive

A mixture containing 39.8 weight percent polyester resin (DYNAPOL S1402™, Huls America Inc., Piscataway, N.J.), 29.8 weight percent bisphenol-A-diglycidyl ether (EPON 1001™ epoxy resin, Shell Chemicals, Houston, Tex.), 26.8 weight percent bisphenol-A-diglycidyl ether (EPON 828™ epoxy resin, Shell Chemicals, Houston, Tex.), 2.4 weight percent 1,4-cyclohexanedimethanol (Eastman Chemical Co., Kingsport, Tenn.), 0.6 weight percent ($\eta^6$-xylenes (mixed isomers))($\eta^5$-cyclopentadienyl)$Fe^+SbF_6^-$ catalyst (prepared according to U.S. Pat. No. 5,191,101) and 0.6 weight percent t-amyl oxalate (prepared according to Karabatsos, et al., *J. Org. Chem.,* 30 (3), 689 (1965)), a reaction accelerator, was prepared as follows: DYNAPOL S1402™ and EPON 1001™ were melt-mixed with stirring at 125° C., after which EPON 828™ was added with stirring. The temperature was lowered to 100° C. and 1,4-cyclohexanedimethanol, catalyst and t-amyl oxalate were added, with continued stirring. A film of this mixture (0.025–0.05 mm thick) was coated with a laboratory hot-knife coater between silicone treated poly (ethyleneterephthalate) (PET) release liners (Toyo Metallizing Co., Tokyo, Japan), then cooled. A section of the extruded epoxy-polyester mixture was removed from the liners and placed on the non-coated side of a PET release liner, after which the epoxy-polyester coated side was placed on a release-coated nickel mold (1 cm wide by 1 cm long) consisting of linear protrusions having triangular cross sections and measuring 100 micrometers high×100 micrometers wide at their base, spaced 250 microns apart. This construction was clamped between two 10 cm×20 cm glass plates with office binder clips and the assembly was heated in a convection oven at 100° C. for 10 minutes. On cooling, the molded adhesive was removed from the mold and visually inspected. Features of the mold were seen to be reproduced in the adhesive with good fidelity. The molded adhesive was exposed to light at 420 nm using a Philips Superactinic TLD 15W/05 bulb for 10 minutes, then placed feature-side down on a Kapton™ polyimide film (DuPont Co., Wilmington, Del.) and heated at 100° C. for 10 minutes. Bonding to Kapton™ was accomplished with retention of molded features, although some flow of adhesive could be seen.

Example 2

Epoxy-Polyester-Acrylate Shaped Adhesive

A mixture of 11.4 g trimethylolpropane triacrylate (TMPTA, Sartomer SR351™, Sartomer Co., Inc., Exton, Pa.) and 1.06 g 2,2-dimethoxy-2-phenylacetophenone (KB-1 photoinitiator, Sartomer Co., Inc.) was added to 102.6 g of the heated, stirred epoxy-polyester mixture of Example 1, in order to form a moldable adhesive having greater flow resistance on curing. The molding and curing procedure of Example 1 was repeated, with the additional step of exposing the molded adhesive to UV light (Sylvania 350BL bulbs, Siemens Corp./Osram Sylvania Inc., Danvers, Conn.) to effect polymerization of TMPTA prior to activation of the cationic initiator by means of Superactinic Philips TLD 15W/03 bulbs. Thermal curing of the adhesive for 10 minutes at 100° C. on a Kapton™ substrate provided a material having considerably less loss of molded features than was seen in Example 1.

Example 3

Epoxy-Acrylate Shaped Adhesive

A mixture of 3 parts bisphenol-A-diglycidyl ether (EPON 828™ epoxy resin, Shell Chemicals, Houston, Tex.), 2 parts phenoxyethyl acrylate (Sartomer Co., Inc., Exton, Pa.) and 1 part TMPTA was treated with a mixture of an aromatic sulfonium complex salt-type cationic photoinitiator (Cyracure UVI-6974™, Ciba-Geigy, Ardsley, N.Y.) and a free-radical type photoinitiator (CGI-1700™, Ciba-Geigy) such that the photoinitiator mixture comprised 2 percent by weight of the total mixture. The mixture was degassed under vacuum and poured onto a mold as shown in FIG. 1. Molding apparatus 10 comprised a heated, gold-plated mold 12 having frustoconical posts 14 coated with a fluorochemical release agent such as FX161™ (3M Company, St. Paul, Minn.) (not shown) and resting on PET release liner 16, which was atop silicone rubber sheet 18. After polymerizable mixture 20 was poured onto mold 12, a conformance assembly 22 comprising cured RTV silicone (Dow Corning 732™, Dow Corning Co., Midland, Mich.), 0.050 mm thick, covered on both sides with 0.050 thick PET release liners 24 was placed on top of polymerizable mixture 20. This assembly was clamped between glass plates 28, 30 by means of clamps 32, 34 and rolled vigorously with a 5 kg hand roller (not shown) to remove excess polymerizable mixture 20 from the top of the posts of mold 12. The resulting sandwich assembly was irradiated by low-intensity superactinic lights (Philips TLD 15W/05 bulbs, Philips North America Electronics Inc./Philips Lighting Co., Somerset, N.J.) for 10 minutes to effect polymerization of the acrylates. After cure, the clamps were removed and the cured adhesive was removed from the mold.

To maintain support of the film and reduce lateral shrinkage, it was best to choose a PET release liner to which the molded adhesive would adhere when removed from the mold.

With the use of an optical microscope equipped alignment bonder, the molded adhesive was aligned to a silicon chip onto which IJ5000™ photoimageable adhesive (DuPont Co., Wilmington Del.) was patterned. Approximately 1–3 kg force was used to press the adhesive to the chip. Optical microscopy showed no appreciable distortion of the molded features at these pressures. While still under pressure, the molded adhesive was irradiated for 20 minutes by a Sylvania F4T5/BL UV lamp (Osram Sylvania) to initiate epoxy cure using the sulfonium catalyst. The temperature was then raised to 100° C. and held for two minutes, to complete wet-out of the adhesive on the chip and to cure the epoxy. After cooling to 55° C., pressure was removed and the PET liner was removed from the shaped adhesive. To complete the cure of the molded adhesive, the bonded chip was placed in an oven at 175° C. for 30 minutes. The fully bonded chip was observed to have excellent registry to the silicon substrate, retention of molded features, and adhesion to the substrate. Forces of 2–5 kg were required to disbond the shaped adhesive from the silicon chip, and this force did not decrease by more than 50% after soaking in a basic pH inkjet ink for 15 days at 70° C.

Example 4

Epoxy-Acrylate Shaped Adhesive

A shaped adhesive was prepared and molded as described in Example 3 using 18% by weight ethoxylated bisphenol-A diacrylate (Sartomer 349™, Sartomer Co., Inc., Exton, Pa.), 18% by weight isobornyl acrylate (Aldrich Chemical Co., Milwaukee, Wis.), 18% by weight polyester diacrylate (Fuller 6089™, H. B. Fuller Co., St. Paul, Minn.), 45% by weight bisphenol-A diglycidyl ether (Epon 828™, Shell Chemical Co., Houston, Tex.), 1% by weight UV/visible photoinitiator (Irgacure 1700™, Ciba Geigy, Ardsley, N.Y.), and 2% by weight cationic photoinitiator (triarylsulfonium $SbF_6$; see, for example, U.S. Pat. No. 4,256,828, example 37, which is incorporated herein by reference). The adhesive was molded and cured as described in Example 3.

Example 5

Epoxy-Cyanate Shaped Adhesive

A shaped adhesive according to the invention was prepared by mixing 1 part polyol, i.e., polyhydroxylated polymer, (polyTHF CD1000™, BASF Corp., Mount Olive, N.J.), 4 parts cycloaliphatic epoxy resin (bis-(6-methyl-3,4-epoxycyclohexyl)adipate, ERL4299™, Union Carbide Corp., Danbury, Conn.), and 6 parts bisphenol-A dicyanate (AroCy™ B30 Cyanate Ester Semisolid Resin, Ciba-Geigy Corp., Hawthorne, N.Y.) with stirring at 100° C. The mixture was cooled to 23° C., then mixed with 2 weight percent, based on the total weight of polymerizable components, of LAC catalyst (a mixture comprising a 1:1:2.93 weight-to-weight ratio of $SbF_5$:diethylene glycol (DEG):2,6-diethylaniline (DEA), the preparation of which is described in U.S. Pat. No. 4,503,211, Example 1, which is incorporated herein by reference).

The resulting mixture was coated onto a nickel fiber optic coupler mold, as described in U.S. Pat. No. 5,343,544, Example 5, incorporated herein by reference, which had been previously treated with FX 161 release agent, then heated at 100° C. for 10 minutes to cure the epoxy component. After cooling to 23° C., the epoxy-cured, molded composition was removed from the mold and clamped between two glass microscope slides. The resulting sandwich was heated at 200° C. for 10 additional minutes to cure the cyanate ester component and bond the workpiece to the glass. By optical microscopy, replication of molded features was of lesser quality than that seen for the epoxy-acrylate adhesive described in Example 3. In addition, even the more facile adhesion to glass was less strong than the epoxy-acrylate bond to more challenging silicon wafer substrate.

Injection and Curing

IPN formulations such as those described above have also been microreplicated using an injection molding approach. In this technique, the mold was placed in an injection molding cell such as that shown in the FIG. 1. The mold was held down by a piece of PET release liner and a glass plate such that the release liner was in intimate contact with the tops of the posts on the mold. A gasket was formed around the mold (or an O-ring may be used) and then the monomer solution was injected into the space between the mold and the release liner. This was best done by first evacuating the injection molding cell and then allowing the monomer to refill the evacuated cell. After detaching the cell from the vacuum, the acrylate portion of the IPN was cured with visible light. The cell was then opened and the film released from the mold. Low viscosity solutions such as the epoxy/acrylate described in Example 3 were best for this technique to improve the filling of the thin space above the mold.

Example 6

Cyanate-Acrylate Shaped Adhesive

A mixture was prepared by heating 5 parts AroCy™ B30 cyanate ester to 100° C. and adding thereto 3 parts phenoxyethyl acrylate and 1 part trimethylolpropane triacrylate with stirring, after which a catalyst mixture comprising 0.5% by weight, based on the total weight of polymerizable components, of bis(cyclopentadienyl iron dicarbonyl), $\{C_5H_5Fe(CO)_2\}_2$, available from Pressure Chemical Co., Pittsburgh, Pa.) dissolved in the minimum amount of 3-methyl sulfolane (Aldrich Chemical Co., Milwaukee, Wis.) and 0.5% by weight, based on the total weight of polymerizable components, of 2,2-dimethoxy-2-phenylacetophenone (Irgacure™ 651 photoinitiator, Ciba-Geigy Corp., Hawthorne, N.Y.) was added with stirring at 23° C. The solution was degassed under vacuum and molded using the mold and apparatus described in Example 3. Optical microscopy showed that some hole distortion occurred upon peel from the mold. The molded construction can be bonded to a coated silicon chip by, e.g., applying it to a chip with pressure and heating the assembly in an oven at 100° C. for 15 minutes to effect cure of the cyanate ester.

Example 7

Polyester-Acrylate Shaped Adhesive

A mixture of 25 wt % polyester polyol (Hüls 1402™ polyester, Hüls America, Piscataway, N.J.), 37.5 wt % phenoxyethyl acrylate (Sartomer Co., Inc.) and 37.5 wt % ethoxylated bisphenol-A diacrylate (Sartomer 349™, Sartomer Co., Inc.) was heated and stirred at 100° C., then further admixed with 0.5 wt % KB-1™ photoinitiator (Sartomer). The mixture was cooled to 40° C. and poured onto a mold and clamped as described in Example 3. The clamped assembly was irradiated with a Sylvania F4T5/BL UV lamp (Osram Sylvania) for 10 minutes to cure the acrylates. After irradiation, the clamps were removed and the cured adhesive was removed from the mold. Good replication of the mold was obtained, as observed by an optical microscope. The molded adhesive was clamped between glass slides and heated to 125° C. for 20 minutes to allow for wet-out of the adhesive onto the surfaces. After cooling, the glass plates were well-adhered to each other and some molded features of the adhesive were retained.

Various modifications and alterations of this invention will become apparent to those skilled in the art without departing from the scope and spirit of this invention, and it should be understood that this invention is not to be unduly limited to the illustrative embodiments set forth herein.

We claim:

1. A method for preparing a shaped adhesive article comprising the steps of:
   a) molding an adhesive mixture in a mold, said mixture including precursor, or
      1) a first polymer precursor and a second polymer precursor, or
      2) a first polymer precursor and a thermoplastic polymer,
   b) polymerizing said first polymer precursor in said mold thereby allowing the polymerized adhesive mixture to be removed from said mold while substantially retaining the shape of said mold, thus producing a shaped adhesive article having one or more surfaces having features complementary to the surface of the mold wherein said features are selected from the group consisting of holes, indentations, and projections,
   c) removing said shaped adhesive article from said mold, and
   d) adhering said shaped adhesive article to a substrate.

2. The method according to claim 1 wherein said adhering is produced by polymerizing said second polymer precursor or thermoforming said thermoplastic polymer when said mixture is in contact with said one or more surfaces of said substrate.

3. The method according to claim 1 wherein each of said polymer precursor comprises one or more polymerizable species and one or more curing agents for said polymerizable species.

4. The method according to claim 1 wherein
   in step b of claim 1, said first polymer precursor is polymerized in the presence of a second polymer precursor that is essentially incapable of polymerizing with said first polymer precursor, and
   in step d of claim 1, said adhering said shaped adhesive to said substrate is by polymerizing said second polymer precursor in a second polymerization step while said mixture is in contact with the surface of said substrate.

5. The method according to claim 1 wherein:
   in step b of claim 1, said first polymer precursor is polymerized in the presence of a thermoplastic polymer, and
   in step d of claim 1, said adhering said shaped adhesive to said substrate is by thermoforming said thermoplastic polymer while said mixture is in contact with said substrate.

6. The method according to claim 4 wherein said second polymerization step produces one or both of an interpenetrating polymer network and a semi-interpenetrating polymer network.

7. The method according to claim 5 wherein said polymerization step produces one or both of an interpenetrating polymer network and a semi-interpenetrating polymer network.

8. The method of claim 5 wherein said thermoplastic polymers are selected from the group consisting of polyesters, polycarbonates, polyurethanes, polysiloxanes, polyacrylates, polyarylates, polyvinyls, polyethers, polyolefins, polyamides, cellulosics, and combinations and composites thereof.

9. The method according to claim 8 wherein said thermoplastic polymers are selected from the group consisting of polyesters, polyamides, polyurethanes, and polyolefins.

10. The method according to claim 1 wherein one or both of said polymer precursors is a thermosettable polymer precursor.

11. The method according to claim 10 wherein said polymer precursors which produce thermosetting polymers are selected from the group consisting of acrylates, epoxies, cyanate esters, and vinyls.

12. The method according to claim 10 wherein said thermosetting polymers are prepared by one or both of free-radical or cationic polymerization.

13. The method according to claim 12 wherein said cationic polymerization is initiated by an organometallic complex salt or an onium salt.

14. The method according to claim 1 wherein said polymer precursors are selected from the group consisting of epoxies, alkyl vinyl ethers, cyclic ethers, styrene, divinyl benzene, vinyl toluene, N-vinyl compounds, alpha olefins, lactams and cyclic acetals.

15. The method according to claim 12 wherein said polymerization is initiated by a thermal or photo initiator.

16. The method according to claim 1 wherein said mixture further comprises a photosensitizer or photoaccelerator to alter the wavelength sensitivity of the polymerizable composition.

17. The method according to claim 1 wherein said featured surface of said shaped adhesive article is adhered to a substrate.

* * * * *

UNITED STATES PATENT AND TRADEMARK OFFICE

CERTIFICATE OF CORRECTION

PATENT NO.: 6,054,007

DATED: April 25, 2000

INVENTOR(S): Gary T. Boyd, Robert J. DeVoe, Ilya Gorodisher, and David A. Ylitalo It is certified that error appears in the above-identified patent and that said Letters Patent is hereby corrected as shown below:

On the Title Page

[22] Filed: "Apr. 10, 1997" should read -- Apr. 9, 1997 --

Col. 9, Line 14: "ERL-422 ™ " should read -- ERL-4221™ --

Col. 14, Line 29 "$MP^p$" should read -- $M^p$ --

Col. 15, Line 64 "$R^1$" should read -- $R^7$ --

Col. 18, Line 32 "Comparative Example 1" should read -- Example 1 --

Col. 22, Line 5 "including precursor, or" should read -- including --

Signed and Sealed this

Seventeenth Day of April, 2001

*Attest:*

NICHOLAS P. GODICI

*Attesting Officer*

*Acting Director of the United States Patent and Trademark Office*

UNITED STATES PATENT AND TRADEMARK OFFICE

CERTIFICATE OF CORRECTION

PATENT NO. : 6,054,007
DATED : April 25, 2000
INVENTOR(S) : Boyd, Gary T.

It is certified that error appears in the above-identified patent and that said Letters Patent is hereby corrected as shown below:

Column 18,
Line 32, "Example 1" should read -- Comparative Example 1 --

Column 19,
Line 26, "Example 1" should read -- Comparative Example 1 --

Signed and Sealed this

Tenth Day of September, 2002

*Attest:*

JAMES E. ROGAN

*Attesting Officer*

*Director of the United States Patent and Trademark Office*